United States Patent Office 3,282,702
Patented Nov. 1, 1966

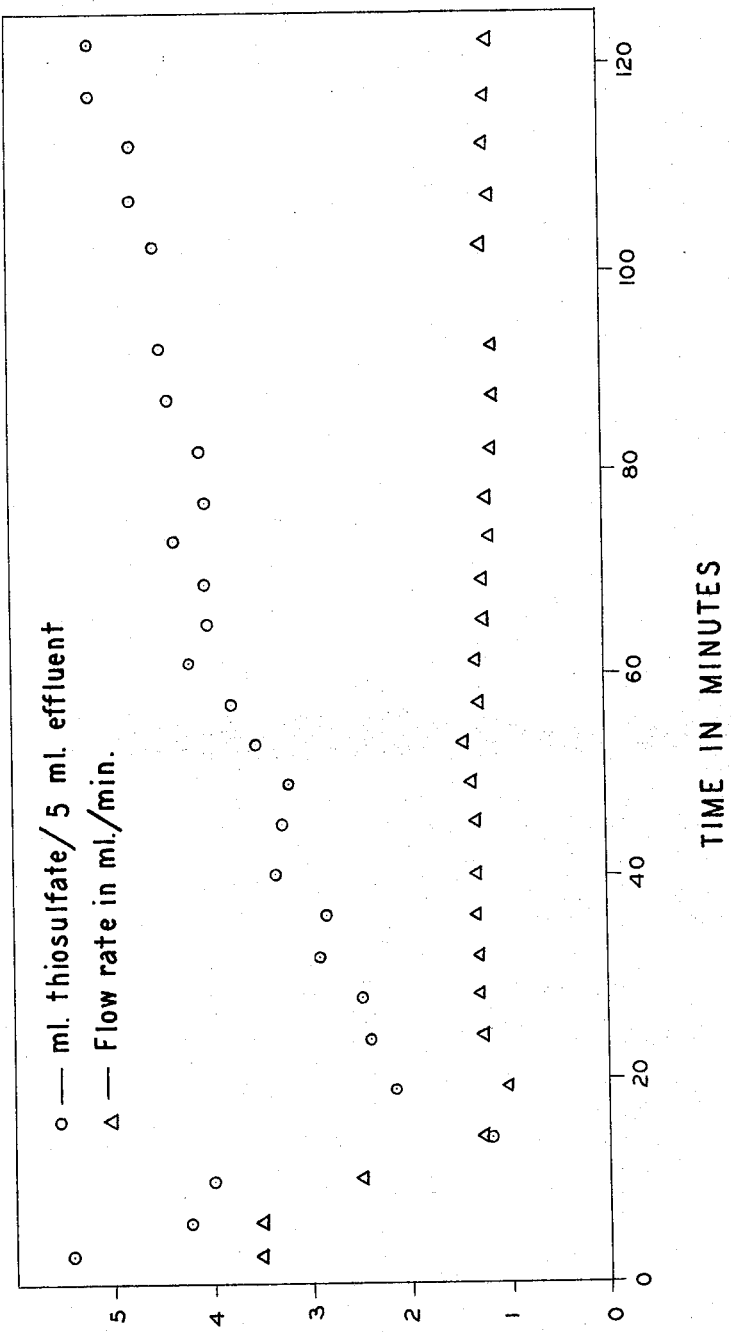

3,282,702
PROCESS FOR REMOVING HYDROGEN
PEROXIDE FROM LIQUIDS
Heinz R. Schreiner, Tonawanda, N.Y., assignor to Union
Carbide Corporation, a corporation of New York
Filed July 16, 1963, Ser. No. 295,357
7 Claims. (Cl. 99—54)

This invention relates to a process for removing hydrogen peroxide from liquids. More particularly, this invention relates to a process wherein insoluble, resin-bonded catalase is employed to remove hydrogen peroxide from potable liquids.

Heretofore it has been suggested that hydrogen peroxide could be added to potable liquids (e.g. milk and wine) to sterilize the liquids in order to prevent spoilage during storage or shipment. It is generally necessary to remove the residual hydrogen peroxide usually remaining in potable liquids so treated because of statutory requirements relating to potable liquids and because of undesirable side reactions which can occur to impair the quality of the potable liquid if left in contact with hydrogen peroxide for prolonged periods of time.

To date satisfactory means have not been available for removing such residual hydrogen peroxide and consequently hydrogen peroxide sterilization of potable liquids has not gained wide acceptance. By way of illustration, one known means for removing residual hydrogen peroxide from potable liquids involves adding soluble catalase to the liquid to take advantage of the catalytic effect of catalase on the decomposition of hydrogen peroxide to produce water and oxygen. The water produced is innocuous and the oxygen is readily evolved from the liquid. However, the disadvantage of this method resides in the difficulty in recovering the soluble catalase with resulting high consumption of catalase and contamination of potable liquid with unremoved catalase.

It is the object of this invention to provide a process for efficiently removing hydrogen peroxide from potable liquids which does not introduce any contaminant into the liquid so processed.

This invention provides a process for removing hydrogen peroxide from a potable liquid containing hydrogen peroxide which involves (1) contacting the hydrogen peroxide-containing potable liquid with an enzymatically-active, water-insoluble, catalyst composition composed of catalase chemically bonded to a normally solid, water-insoluble polymeric carrier having at least one electrophilic functional group capable of replacing an active hydrogen atom in an amino group to form a carbon-to-nitrogen linkage, said catalase being chemically bonded to said polymeric carrier via a covalent linkage formed from nucleophilic functional groups on the protein moiety of the catalase and the electrophilic functional groups on the polymeric carrier, and (2) separating the potable liquid from the catalyst composition. The catalyst composition catalyzes the decomposition of the hydrogen peroxide initially present in the potable liquid thereby freeing the potable liquid of the hydrogen peroxide without introducing another contaminant into the potable liquid.

The catalyst compositions that are suitable for use in the process of this invention are the reaction products of catalase and normally solid, water-insoluble polymeric carriers which have at least one electrophilic functional group capable of replacing an active hydrogen atom in an amino group to form a carbon-to-nitrogen linkage. These catalyst compositions are enzymatically active (e.g., they retain, at least to some extent, the catalytic effect of catalase on the decomposition of hydrogen peroxide to produce water and oxygen). These catalyst compositions contain catalase bonded to a polymeric carrier by a chemical bond which is covalent and, consequently, highly stable. This covalent linkage is formed by the reaction of a nucleophilic functional group on the protein moiety of the catalase and an electrophilic functional group on the polymeric carrier.

The catalyst compositions employed in the process of this invention are prepared by chemically bonding catalase to the carrier by way of functional groups non-essential to the enzymatic activity, that is, by way of functional groups on the protein moiety of the heme-enzyme. The functional groups attached to the protein moiety of catalase, namely the amino, phenolic hydroxyl, sulfrydryl and carboxyl groups, are all groups which are nucleophilic, that is, they have unshared pairs of electrons. Catalase can be covalently bound to a polymeric carrier via a covalent linkage formed from the nucleophilic functional groups on the protein moiety of the catalase and electrophilic functional groups on the polymeric carrier. The chemical bonding can involve one or more of said nucleophilic functional groups and one or more of said electrophilic functional groups. Since the chemical bonding is covalent in nature, an insoluble catalyst composition formed by bonding catalase to a polymeric carrier is stable. That is, the catalase is not removed by changes in the pH of the reaction medium as occurs with enzymes reversibly adsorbed on insoluble carriers. Furthermore, the insoluble catalyst composition retains the specific enzymatic activity of the catalase from which it is prepared. That is, it acts upon the same substrates and in the same manner, although it does not provide the same rate of conversion of substrate since the activity of the insoluble catalyst composition generally being considerably lower than that of the pure catalase.

Polymeric carriers that can be employed in preparing the insoluble catalyst composition employed in the process of this invention are normally solid, water-insoluble polymers having at least one suitable electrophilic functional group. It has been found that in order to obtain the desired covalent bonding of the catalase and produce an insoluble catalyst composition which is stable and enzymatically active, the electrophilic functional group on the polymeric carrier must be capable of replacing an active hydrogen atom in an amino group to form a carbon to nitrogen linkage. Illustrative of suitable electrophilic functional groups reactive with an amino group to form a carbon-to-nitrogen linkage one can mention formyl (—C̈—H), choroformyl (—C̈—Cl), chloromethyl (—CH₂—Cl)

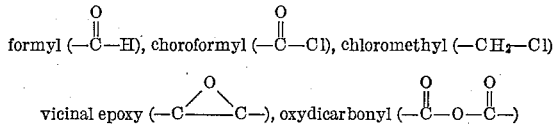

and the like. Functional groups which do not affect the activity of catalase, for example, the chloro or hydroxyl groups, can be present on the water-insoluble polymeric carrier in addition to the above-described suitable electrophilic functional groups; but, advantageously, the polymeric carrier should be free of functional groups which have a tendency to inactivate catalase; for example, functional groups such as cyano (N≡C—), azido (N₃—), hydroxyamino (HONH—), thio (—S—), sulfhydryl (HS—), fluoro (F—) and hydrazino (H₂NNH—).

Illustrative of the suitable polymeric carriers useful in producing the catalyst compositions employed in this invention are the chloride-substituted carboxylic acid-type cation exchange resins, wherein the functional groups are the chloroformyl group and the oxydicarbonyl group, such as chloride-substituted poly(methacrylic acid), chloride-substituted acrylic acid-divinylbenzene copolymers, chloride substituted methacrylic acid-divinylbenzene copolymers, and the like; the normally solid, water-insoluble polymers containing terminal formyl groups such as polyacrolein, poly(methacrolein), copolymers of acrolein or methacrolein with acrylic acid or alkyl esters of acrylic acid, and the like; normally solid, water-insoluble polymers having terminal epoxy groups such as the copolymers of vinyl chloride and glycidyl acrylate, the synthetic epoxy resins obtained by condensation of phenol, acetone and epichlorohydrin, and the like; and normally solid, water-insoluble polymers containing chloroformyl groups such as the homopolymers of allyl chloride or methallyl chloride, the copolymers of allyl chloride or methallyl chloride with vinyl chloride, and the like. Particularly preferred polymeric carriers for preparation of the insoluble catalyst compositions employed in this invention are the chloride-substituted carboxylic acid type cation exchange resins.

The water-insoluble, enzymatically active catalyst compositions employed in this invention can be prepared by any suitable procedure wherein catalase is reacted with one of the hereinbefore described polymeric carriers. For example, a granular form of the polymeric carrier can be suspended in water and an aqueous solution of catalase added thereto and the mixture stirred for a period of from several hours to a day or more. The particle size of the polymeric carrier employed can be varied widely, for example, material as large as 10 mesh, or larger, or as small as 400 mesh, or smaller, is suitable. The amount of catalase which can be bound to the polymeric carrier is, of course, dependent upon the particle size of the carrier, with larger amounts of the catalase being bonded to material of smaller average particle size. Reaction of the catalase and the polymeric carrier can be carried out at any suitable temperature, for example, at room temperature, but is preferably conducted at a low temperature, for example, about 4° C., because of the increased stability of catalase at such temperatures. A suitable buffer, for example, $NaHCO_3$, can be added to the admixture of catalase and polymeric carrier to enhance the activity of the nucleophilic functional groups on the protein portion of the catalase. After reaction of the catalase with the polymeric carrier is complete, the catalyst composition so produced can be washed free of excess catalase, that is, of catalase that has not been chemically bound to the carrier, but is merely adhering to the particle surfaces. The excess catalase can be conveniently removed by first thoroughly washing the catalyst composition with water, then with a neutral salt solution such as an aqueous solution of sodium acetate or sodium chloride, and finally with additional water.

The catalase used in preparing the insoluble catalyst compositions employed in this invention need not be pure substances and can be used regardless of source or method of preparation. Many sources of catalase are known. Thus, catalase can be obtained from animal tissues, blood, molds, or bacteria, with the most common source being beef liver. In preparing the insoluble catalyst composition, the catalase can be employed in the form of a concentrated water solution or in lyophilized form, in which case, it is dissolved in water before admixture with the aqueous suspension of polymeric carrier.

Catalase is an extremely active catalyst. The activity of catalase is usually defined by the "turnover number," that is, the number of molecular equivalents of substrate (i.e. hydrogen peroxide in a potable liquid) transformed per unit time. The turnover number of catalase in catalyzing the decomposition of hydrogen peroxide to water and oxygen is about 2,500,000, that is, the enzyme brings about the decomposition of 2,500,000 moles of hydrogen peroxide per mole of pure catalase per minute at a temperature of 0° C. This extreme activity is not retained when the catalase is covalently bound to a polymeric carrier according to the method of this invention; the activity of the insoluble catalyst composition usually being a few percent, or less, of that of the corresponding pure catalase. However, this decrease in activity is normally of little consequence since the insoluble catalyst compositions still display sufficient activity to be very effective catalysts. The insoluble catalyst compositions employed in this invention, like catalase itself, undergo a gradual loss in catalytic activity; however, the catalytic activity is retained over sufficiently long periods to permit treatment of relatively large amounts of substrate.

The amount of active catalase in the catalyst compositions employed in the process of this invention is not critical and depends on such factors as the desired rate of hydrogen peroxide decomposition, the total amount and particle size of the catalyst composition employed, the amount of hydrogen peroxide in the potable liquid, the desired purity of the potable liquid, the geometry of the catalase resin bed (height, width, depth), and whether batch or column decomposition of hydrogen peroxide is to be carried out. In general, it is desirable to have from $10^{-10}$ moles to $10^{-13}$ moles of active catalase per gram of the polymeric carrier but it is especially desirable to have from $10^{-10}$ moles to $10^{-11}$ moles of active catalase per gram of the polymeric carrier. Other amounts of active catalase can be present but generally no commensurate advantage is gauged thereby. Similarly, no particular particle size of the catalyst composition is critical, but it is generally preferred to have the catalyst composition in a particle size from 1 to 400 mesh and even more desirable from 14 to 40 mesh.

It is often desirable to sterilize the catalyst composition prior to employing in the process of this invention. Various known sterilization procedures are applicable as will be apparent to one skilled in the art. A particularly useful sterilization procedure involves the treatment of catalyst composition with a gaseous mixture of ethylene oxide and carbon dioxide. The gaseous mixture contains from 10 mole-percent to 20 mole-percent of ethylene oxide and from 90 mole-percent to 80 mole-percent carbon dioxide. The treatment involves contacting the catalyst composition with ethylene oxide-carbon dioxide mixture for a prolonged period of time (e.g., 4 hours to 24 hours) at a moderately elevated temperature (e.g., 70–100° F.) while maintaining the gaseous mixture of a pressure of from 10 lb./sq. in. ga. to 30 lb./sq. in. ga.

It is often desirable to employ the catalyst composition in admixture with an inert bulking agent in the process of this invention. Such inert bulking agents can be employed to increase the porosity of the catalyst composition, thereby facilitating liquid flow through the catalyst bed. Suitable inert bulking agents include diatomaceous earth, glass beads, Sephadex (which is a cross-linked dextran, a polysaccharide) and other chemically inert, water-insoluble materials such as sand, etc. In general, from 10 parts to 75 parts by weight of the bulking agent per 100 parts by weight of the catalyst composition are desirable but from 30 parts to 70 parts by weight of the bulking agent per 100 parts by weight of the catalyst composition are especially preferred.

This invention is generally applicable to the removal of hydrogen peroxide from any potable liquid containing hydrogen peroxide. This invention is particularly adapted to removal of hydrogen peroxide from water, milk, fruit juices and concentrates, wine and beer.

In the practice of this invention the hydrogen peroxide-containing liquid can be brought into contact with the catalyst composition in any suitable manner. By way of illustration the process of invention can be conducted in a batchwise manner by forming a mixture of the liquid and the catalyst composition in particulate form in a vessel and agitating the mixture so formed. As a further illustration, the process of this invention can be conducted in a continuous manner by providing a vertical cylindrical column filled with the catalyst composition (preferably in admixture with the above-described inert bulking agents), introducing the hydrogen peroxide-containing liquid into the top of the column, allowing the liquid to pass through the column under the influence of gravity alone or under the influence of both gravity and externally applied means (e.g., pressure applied to the entering liquid or suction applied to the bottom of the column) and allowing liquid to flow from the bottom of the column.

The flow capacity of the above-described catalyst composition-packed columns suitable for use in this invention is directly proportional to the activity of the catalase resin, the amount of resin used and the cross section of the column. It is limited by the resistance of the catalyst bed to flow which, in turn, is dependent on column geometry and particle size of the catalyst. The following theoretical considerations are useful in predicting the performance of such columns. The reaction mechanism of catalase cannot be expressed by the conventional Michaelis-Menten treatment because of the peculiar bimolecular dissociation of the enzyme substrate complex (Equation 2) ["The Chemical Kinetics of Enzyme Action"—K. J. Laidler, Clarendon Press, Oxford (1958)].

(1) $\text{Catalase} + H_2O_2 \underset{k_{-1}}{\overset{k_1}{\rightleftarrows}} \text{catalase} \cdot H_2O_2$ (2) $\text{Catalase} \cdot H_2O_2 + H_2O_2 \overset{k_2}{\rightarrow} \text{catalase} + 2H_2O + O_2$ Under steady-state conditions and overall first order reaction kinetics, the velocity of $H_2O_2$ decomposition on contact with catalase is described by $$\frac{-d[H_2O_2]}{dt} = \frac{k_2}{Ks}[E][H_2O_2]$$

where (4) $$Ks = \frac{k_1 + k_2}{2k_1}$$

is a dimensionless constant and E is defined below.

On rearrangement and integration one obtains the equation:

(5) $$\frac{1}{t}\ln\frac{S_o}{S_t} = \frac{k_2[E]}{Ks} = K_{obs}$$

Equation 5 provides the basis for the kinetic assay of catalase activity. The quantity measured, $k_{obs}$ (in units of sec.$^{-1}$) is related to the initial ($S_0$) and final ($S_t$) substrate concentration; $k_{obs}$ in turn is proportional to the catalase concentration [E] in the assay mixture. Using literature values ["The Chemical Kinetics of Enzyme Action"—K. J. Laidler, Clarendon Press, Oxford (1958)] for $k_2$ and $Ks$ one obtains the relation (6) $k_{obs} = 7.5 \times 10^7 [E]$ assuming a molecular weight of 250,000 for catalase. Since the assay is carried out in a reaction volume of 6 milliliters on $n$ milligrams of catalase, [E] represents the number of moles of active enzyme contained by $n/6$ grams of catalase. Assuming that these relationships hold equally for insoluble catalase, it is possible to predict the course of the steady-state decomposition of hydrogen peroxide on continuous contact with catalase-containing resin. Considering a substrate solution flowing at $v$ centimeters per second through a bed of catalase resin of $h$ centimeters height, the contact time between the insoluble enzyme and the substrate solution is given by (7) $t = h/v$ seconds Assuming a cross section of $a$ square centimeter and a resin content of $b$ grams for such a bed, the resin concentration $c$ is given by (8) $c = 1000b/a \times h$ grams per liter Combining Equations 5 and 8 yields the enzymic concentration (9) $E = 6000 k_{obs} \times Ks \times b/k_2 \times n \times a \times h$ By combining Equations 5, 7, and 9 one obtains

(10) $\log S_1/S_f = 2.58 \times 10^3 k_{obs} b/n \times a \times v$ where:

$S_1 = H_2O_2$ concentration in the liquid entering resin bed, moles per liter $S_f = H_2O_2$ concentration in the liquid leaving resin bed, moles per liter $n$ = weight of catalase-containing resin assayed for enzymic activity to yield $k_{obs}$ in milligrams $k_{obs}$ = rate constant observed during catalase assay in reciprocal seconds $a$ = cross section of resin bed in square centimeters $b$ = weight of resin bed in grams $v$ = velocity of substrate movement in centimeters per second Separation of the potable liquid whose hydrogen content has been reduced by contact with the catalyst composition employed in the process of this invention can be achieved in any convenient manner. By way of illustration, when the process is conducted in a batchwise manner by agitating a mixture of the liquid and the catalyst composition, separation is readily achieved by decantation or filtration. As a further illustration, when the process is conducted in a continuous manner by passing the liquid through a vertical column packed with the catalyst composition, separation is readily obtained by permitting the liquid to flow from the bottom of the column under the influence of gravity.

The process of this invention is conveniently conducted by contacting the liquid with the catalyst composition at temperatures from 32° F. to 104° F. or preferably a temperature from 32° F. to 70° F.

Although this invention has been described with particular reference to the removal of hydrogen peroxide from potable liquids contaminated therewith, it should be recognized that this invention is also adapted to the removal of hydrogen peroxide from any liquid. By way of illustration, this invention has application to removal of hydrogen peroxide from such non-potable liquids as salt, protein or sugar solutions for intravenous feeding, solution of drugs for injection or numerous industrial formulations that must be packaged aseptically to prevent bacterial spoilage (e.g., liquid cosmetics).

The following general procedures were employed in examples appearing below.

A. STERILIZATION PROCEDURE

The catalyst compositions were packed into glass columns having an inner diameter of 10 mm. The catalyst composition was then exposed to a gaseous mixture containing 10 mole-percent ethylene dioxide and 90 mole-percent of carbon dioxide for 16 hours at an initial gas pressure of 22 lb./sq. in. ga. The temperature during the exposure was from 70–80° F. during most of the exposure time with a maximum of 85–90° F.

B. CATALYST ACTIVITY

The direct kinetic assay of isoluble enzyme preparations is made difficult by the necessity of maintaining the catalytically active material in suspension throughout the assay period. We solved this problem by continuous and vigorous agitation of the reaction mixture. A resin sample so chosen in size as to decompose the substrate according to first order reaction kinetics was suspended in 1.0 milliliter of 0.01 M phosphate buffer, pH 6.8. To initiate the assay, 5.0 milliliters of 0.01 M $H_2O_2$ in the same buffer was added to the enzyme suspension by rapid ejection from a syringe. The progress of peroxide decomposition was followed by a standard iodometric method ["Methods in Enzymology," S. P. Colowick and N. O. Kaplan, eds. Academic Press, New York (1955), Vol. II, p. 785].

C. PEROXIDE DETERMINATION

The amount of peroxide in liquids was determined by a standard titration procedure employing an aqueous 0.005 M sodium thiosulfate ($Na_2S_2O_3$) solution, (5 milliliters of 0.1 M hydrogen peroxide titrates 200 milliliters of 0.005 M sodium thiosulfate solution).

D. BACTERIOLOGICAL ASSAY

Bacteriological assays of milk samples were carried out by a pour plate method employing Tryptone Glucose Extract Agar (Difco). This method is one that is used routinely in the dairy industry for the bacteriological assay of milk. In order to distinguish between bacteriostatic and bactericidal action in samples containing hydrogen peroxide, the bacteriological assay was preceded by the addition of sterile catalase solution to an aliquot of the sample under test. Tryptone glucose extract agar is composed of beef extract, 3 grams; tryptone, 5 grams; d-glucose, 1 gram and agar-agar, 15 grams in 1.0 liter of water. The method used is described in Standard Methods for the Examination of Dairy Products, 9th Edition p. 93 (1948).

E. PREPARATION OF CATALYST COMPOSITIONS

(1) Preparation of Catalyst Composition I

A poly(methacrylic) acid ion exchange resin (Rohm and Haas IRC–50) free acid form (16 to 50 mesh) was dried at 50° C. over sodium hydroxide pellets. Ten grams of the dry resin were refluxed 1 hour with 8 cc. thionyl chloride to convert the carboxy (COOH) groups to chloroformyl (CoCl) groups and the reaction continued overnight at room temperature protected from moisture. The resin was filtered, washed with chloroform and dried in vacuo over sodium hydroxide pellets. Lyophyllized catalase (300 mgs.) and 6 gms of the resin were stirred overnight at 4° C. in 25 mls. of 0.5 N sodium bicarbonate. The resin was filtered, and washed with copious amounts of 0.5 N sodium bicarbonate, 10% sodium acetaate and water at 4° C. The enzyme resin so produced (catalyst composition I) was dried at 4° C. in vacuo over silica gel.

(2) Preparation of Catalyst Composition II

Silimar to the preparation of Catalyst Composition I except enzyme and resin were reacted at 4° C. for 1 week instead of overnight.

(3) Preparation of Catalyst Composition III

A poly(methacrylic) acid ion exchange resin (Rohm and Haas XE–64) free acid form, 100–325 mesh, was converted to the acid chloride with thionyl chloride as described above for IRC–50 and reacted with catalase in the manner described previously for preparation of Catalyst Composition I. The enzyme resin was washed with water, 0.1 M NaCl and water until the washings were free of catalytic activity. The product (Catalyst Composition III) was dried by washing with acetone on the filter and air drying.

The following examples illustrate the present invention.

EXAMPLE I

Two catalyst compositions (i.e., Catalyst Composition I and Catalyst Composition II produced as described above) were sterilized to produce a sterile catalyst composition suited for use in the process of this invention. The above-described Sterilization Procedure was employed and the catalyst activity before and after sterilization (measured as described above) was determined. The results appear in Table I.

TABLE I.—EFFECT OF ETHYLENE OXIDE STERILIZATION ON THE ENZYMIC ACTIVITY OF CATALYST COVALENTLY BONDED TO AMBERLITE ION EXCHANGE RESIN IRC–50

|  | Assay Weight (mg.) | $k_{obs}$ (sec.$^{-1}$) | Moles of Active Catalase/g. of Carrier |
|---|---|---|---|
| Cat. Comp. I: |  |  |  |
| Presterilization | 71 | 0.00307 | 3.5×10$^{-12}$ |
| Poststerilization | 71 | 0.00349 | 2.3×10$^{-12}$ |
| Cat. Comp. II: |  |  |  |
| Presterilization | 70 | 0.00833 | 9.5×10$^{-12}$ |
| Poststerilization | 70 | 0.00525 | 6.0×10$^{-12}$ |

EXAMPLE II

This example illustrated the removal of hydrogen peroxide from water in accordance with the process of this invention.

In order to obtain a resin column of adequate height yet with low enough activity to secure an easily measurable effluent hydrogen peroxide concentration at the low flow rates attainable with the small-particle carrier resin, an inert bulking agent (washed Hyflo-Supercel, a brand of diatomaceous earth (Johns-Manville Co.)) was admixed on Amberlite XE–64 ion exchange resin containing $0.21 \times 10^{-10}$ moles of active enzyme per gram (Catalyst Composition III produced as described above). The figure illustrates the approximately steady-state decomposition of $H_2O_2$ that was attained with this material.

To test its practical validity, Equation 10 was applied to the column decomposition described in the figure. The performance and design characteristics of this column were as follows:

$S_i = 18.2$ milliliters thiosulfate/5 milliliters $H_2O_2$ solution
$S_f = 4.2$ milliliters thiosulfate/5 milliliters $H_2O_2$ solution
$k_{obs} = 0.0053$ sec.$^{-1}$
$b = 0.050$ gram
$n = 20$ milligrams
$a = 0.785$ square centimeter The flow velocity of the substrate in contact with the resin was not directly determined. At a flow rate of 1 milliliter per minute, the linear velocity of entry into the catalyst bed was 1.3 centimeters per minute. Assuming the effective cross section of the catalyst bed to be ⅓ of the column cross section $a$, a flow velocity of 3.9 centimeters per minute or 0.065 centimeters per second is obtained. Applying Equation 10:

$$\log S_i/S_f = 2.58 \times 10^3 k_{obs} \times b/n \times a \times v$$

to this situation shows that $$\log 18.2/4.2 = 2.58 \times 10^3 \times 0.0053 \times 0.050/20$$
$$\times 0.785 \times 0.065, \text{ or } 0.64 = 0.67$$

This close agreement corroborates the general correctness of the derivation of Equation 10 and makes it a useful tool for the prediction of the catalytic performance of columns of insoluble catalase employed in this invention.

EXAMPLE III

This example illustrates the removal of hydrogen peroxide from milk in accordance with the process of this invention employing a catalyst composition (Catalyst Composition I) which had not been sterilized. A column 10 millimeters in diameter and 30 millimeters in height was prepared from this material containing $3.8 \times 10^{-12}$ moles active catalase per gram. Milk to which hydrogen peroxide has been added was allowed to flow through this column at rates varying from 0.25 to 0.74 milliliters per minute. The effluent concentration of hydrogen peroxide was determined at intervals. Results are shown below.

TABLE II.—USE OF COVALENTLY-BONDED CATALASE RESIN (IRC-50) AS FIXED BED CATALYST FOR THE DECOMPOSITION OF HYDROGEN PEROXIDE IN MILK

| Elapsed Time (minutes) | Flow Rate (ml./min.) | Ml. 0.005 M Thiosulfate/5 ml. Effluent |
|---|---|---|
| 17 | 0.32 | 0 |
| 24 | 0.74 | [1] 2.36 |
| 44 | 0.25 | 0 |
| 92 | 0.35 | 0.59 |
| 111 | 0.26 | 0 |

[1] At 21 min. elapsed time gas bubbles were released from the column causing temporary channeling as evidenced by the increased flow rate seen.
Input $H_2O_2$ concentration: 0.1 M in milk. 5 ml. 0.1 M $H_2O_2$ titrates, 200 ml. 0.005 M thiosulfate.

Application of Equation 10 to this column indicates a critical flow rate of 0.3 ml./min., i.e., at flow rates exceeding this value hydrogen peroxide will be present in the effluent. The latter calculations were based on a minimal detectable $H_2O_2$ concentration in milk of $2.5 \times 10^{-6}$ M, and an effective cross section of the catalyst bed of ⅓ of the column cross section. This critical flow rate was borne out by the experimental observations shown above on Table II.

EXAMPLE IV

This example illustrated the removal of hydrogen peroxide from milk in accordance with the process of this invention employing a catalyst composition which had been sterilized as described above.

In one typical experiment 1 gram of IRC–50 Amberlite ion exchange resin containing $6 \times 10^{-12}$ moles of covalently bound active enzyme (Catalyst Composition II) was mixed with about 40 glass beads of 4-mm. diameter and packed into a glass column of 10-mm. inner diameter. After sterilization with ethylene oxide in the manner described above, the resulting cylindrical resin bed, measuring 80-mm. in height, was washed with sterile 0.01 M phosphate buffer, pH 6.8. The effluent was free of bacterial growth, indicating that the sterilization procedure used was adequate.

Raw milk sterilized by the addition of one volume percent of 30% hydrogen peroxide (milk 0.1 M with respect to $H_2O_2$) and incubation at 62° C. for 30 minutes was allowed to flow through the column at an average rate of 0.2 milliliter per minute. This was the maximum flow rate attainable with a hydrostatic head of 15–17 centimers. About 30 milliliters of effluent milk was collected. Aliquots of effluent milk were examined for the presence of hydrogen peroxide and viable bacteria in accordance with the above described general procedures. Bacteriological assays were performed on milk immediately after passage through the column as well as after incubation at 34° C. for as many as 12 days. The experimental results outlined in Table III show that milk treated in the manner described is sterile as well as free of hydrogen peroxide.

TABLE III.—BACTERIOLOGICAL AND CHEMICAL ASSAY OF PEROXIDE-TREATED MILK

| Sample | Bacteriological Assay, Days of Incubation at 34° C.[1] | | | | Peroxide Content, Ml. 0.005 M $Na_2S_2O_3$ Needed to Titrate $H_2O_2$ Present in 5-m.l Sample |
|---|---|---|---|---|---|
|  | 1 | 2 | 6 | 12 |  |
| CC | 0 |  |  |  | 0 |
| $C_0$ | 783 | >1,000 | $7.2 \times 10^7$ | $6 \times 10^8$ | 0 |
| $C_1$ | 3 | >1,000 | $5.0 \times 10^7$ | $4 \times 10^8$ | 0 |
| $S_1$ | 0 | 0 | 0 | 0 | 162.5 |
| $S_1A$ | 0 | 0 |  |  | 0 |
| $S_1B$ |  |  | 0 |  | 0 |
| $S_1C$ |  |  |  | 0 | 0 |

[1] The numbers in the columns indicate colonies per 0.1 milliliter of milk, an average of four plates.

Symbols.—
CC, Sterile buffer poured through the resin to test its sterility.
$C_0$, Raw milk.
$C_1$, Raw milk pasteurized by heating in a water bath at 62° C. for 30 min.
$S_1$, Raw milk made 0.1 M with respect to $H_2O_2$ and heated at 62° C. for 30 min.
$S_1A$, First aliquot of effluent milk passing through catalase-containing resin column.
$S_1B$, Second aliquot.
$S_1C$, Third aliquot.

After incubation at 34° C. for 17 days one milk sample that had been passed through the column was tested by a group of six persons. The consensus was that the milk was palatable and free of stale, scorched or other objectionable flavors.

What is claimed is:

1. A process for removing hydrogen peroxide from a liquid containing hydrogen peroxide which process comprises (1) contacting said liquid with an enzymatically-active, water-insoluble, catalyst composition consisting essentially of catalase bonded to a normally solid, water-insoluble polymeric carrier having at least one electrophilic functional group capable of replacing an active hydrogen atom in an amino group to form a carbon-to-nitrogen linkage, said catalyst being chemically bonded to said polymeric carrier via a covalent linkage formed from nucleophilic functional groups on the protein moiety of the catalase and the electrophilic functional groups on the polymeric carrier and (2) separating the liquid from the catalyst composition.

2. A process for removing hydrogen peroxide from a liquid selected from the group consisting of water, fruit juices, wine, beer and milk containing hydrogen peroxide, which process comprises (1) contacting said liquid with an enzymatically-active, water-insoluble, catalyst composition consisting essentially of catalase bonded to a normally solid, water-insoluble polymeric carrier having at least one electrophilic functional group selected from the group consisting of the formyl, chloroformyl, chloromethyl, vicinyl epoxy and oxydicarbonyl groups, said catalyst being chemically bonded to said polymeric carrier via a covalent linkage formed from nucleophilic functional groups on the protein moiety of the catalase and an electrophilic functional group on the polymeric carrier and (2) separating the liquid from the catalyst composition.

3. A process for removing hydrogen peroxide from milk containing hydrogen peroxide which process comprises (1) contacting said milk with an enzymatically-active water-insoluble catalyst composition consisting essentially of catalase bonded to a normally solid, water-insoluble polymeric carrier having at least one electrophilic functional group selected from the group consisting of the formyl, chloroformyl, chloromethyl, vicinyl epoxy and oxydicarbonyl groups, said catalyst being chemically bonded to said polymeric carrier via a covalent linkage formed from the nucleophilic functional groups on the protein moiety of the catalase and an electrophilic functional group on the polymeric carrier and (2) separating the milk from the catalyst composition.

4. A process for removing hydrogen peroxide from water containing hydrogen peroxide which process comprises (1) contacting said water with an enzymatically-active, water-insoluble, catalyst composition consisting essentially of catalase bonded to a normally solid, water-insoluble polymeric carrier having at least one electrophilic functional group selected from the group consisting of the formyl, chloroformyl, chloromethyl, vicinyl epoxy and oxydicarbonyl groups, said catalyst being chemically bonded to said polymeric carrier via a covalent linkage formed from the nucleophilic functional groups on the protein moiety of the catalase and an electrophilic functional group on the polymeric carrier and (2) separating the water from the catalyst composition.

5. A process for removing hydrogen peroxide from milk containing hydrogen peroxide which process comprises (1) contacting at a temperature from 32° F. to 104° F. said milk with an enzymatically-active, water-insoluble, catalyst composition consisting essentially of catalase bonded to a normally solid, water-insoluble polymeric carrier having chloroformyl groups, said catalyst being chemically bonded to said polymeric carrier via a covalent linkage formed from nucleophilic functional groups on the protein moiety of the catalase and the chloroformyl groups on the polymeric carrier and said catalyst having from $10^{-10}$ to $10^{-13}$ moles of active catalase per gram and (2) separating milk from the catalyst composition.

6. A process for removing hydrogen peroxide from water containing hydrogen peroxide which process comprises (1) contacting at a temperature from 32° F. to 104° F. said water with an enzymatically-active, water-insoluble, catalyst composition consisting essentially of catalese bonded to a normally solid, water-insoluble polymeric carrier having chloroformyl groups, said catalyst being chemically bonded to said polymeric carrier via a covalent linkage formed from nucleophilic functional groups on the protein moiety of the catalase and the chloroformyl groups on the polymeric carrier and said catalyst having from $10^{-10}$ to $10^{-13}$ moles of active catalase per gram and (2) separating water from the catalyst composition.

7. A process for removing hydrogen peroxide from a liquid selected from the group consisting of water, fruit juices, wine, beer and milk containing hydrogen peroxide which process comprises (1) introducing said liquid into the top of a vertical column filled with a porous admixture of (a) an inert bulking agent and (b) an enzymatically-active, water-insoluble, catalyst composition consisting essentially of catalase bonded to a normally solid, water-insoluble polymeric carrier having at least one electrophilic functional group selected from the group consisting of the formyl, chloroformyl, chloromethyl, vicinyl epoxy and oxydicarbonyl groups, said catalyst being chemically bonded to said polymeric carrier via a covalent linkage formed from nucleophilic functional groups on the protein moiety of the catalase and an electrophilic functional group on the polymeric carrier, (2) flowing said liquid through said admixture and (3) separating the liquid from the catalyst composition at the bottom of the column.

References Cited by the Examiner
UNITED STATES PATENTS

| | | | |
|---|---|---|---|
| 3,041,250 | 6/1962 | Wolnak et al. | 195—109 |
| 3,126,324 | 3/1964 | Mitz et al. | 195—63 |
| 3,167,485 | 1/1965 | Katchalski et al. | 195—63 |

OTHER REFERENCES

Bar-Eli et al., Nature, Dec. 3, 1960, vol. 188, pages 856–857.

Mitz et al., J.A.C.S., vol. 81, July 1959, pages 4024–4028.

Peterson et al., J.A.C.S., Feb. 20, 1956, pages 751–755.

A. LOUIS MONACELL, *Primary Examiner.*

L. M. SHAPIRO, *Examiner.*